This invention relates to grids for electric discharge devices and, more particularly, to frame grids.

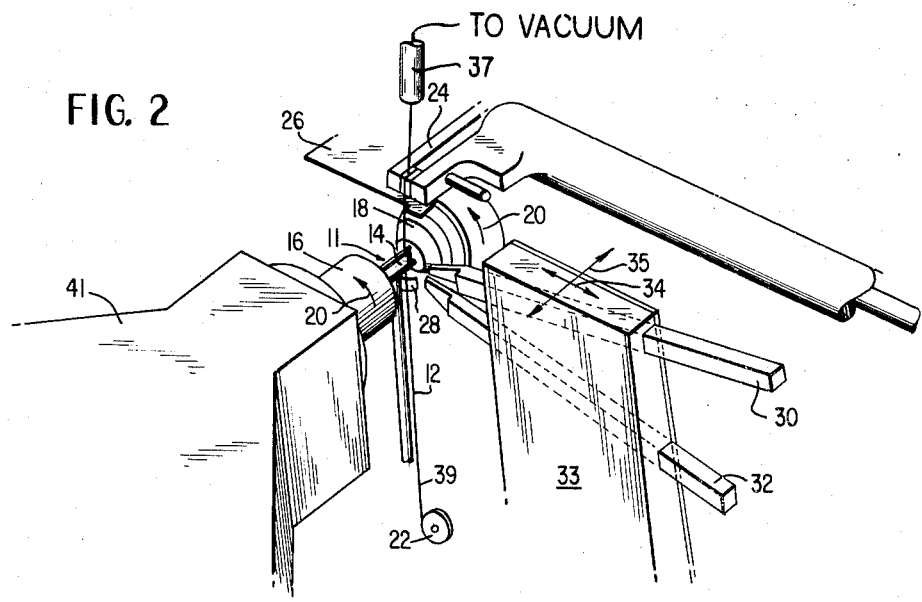
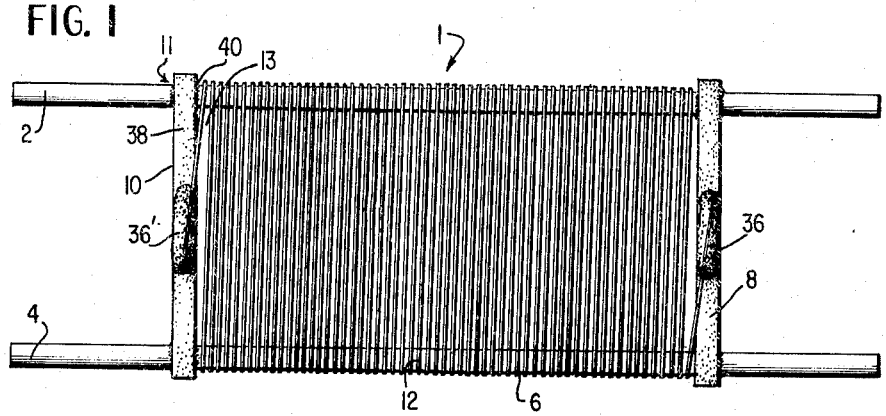
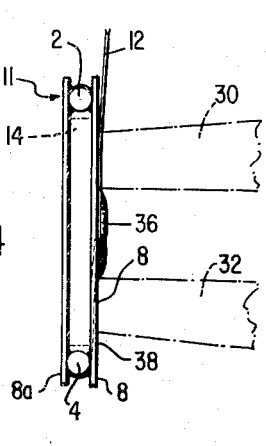
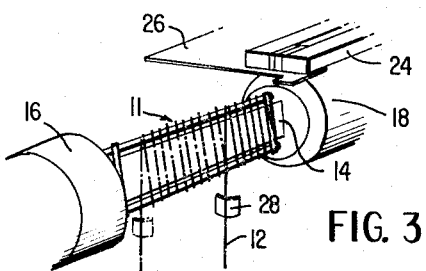
INVENTORS.
JOHN C. McGILL
THOMAS H. HOOVER
LOCKERY W. HEFLIN
BY
ATTORNEY 3,210,592
FRAME GRIDS
John C. McGill, Utica, and Thomas H. Hoover and Lockery W. Heflin, Owensboro, Ky., assignors to General Electric Company, a corporation of New York
Filed Aug. 7, 1963, Ser. No. 300,556
3 Claims. (Cl. 313—350)

In fabricating frame grids it is desirable to be able to space lateral grid wire along the length of a grid frame from one lateral support member or strap to the other in accordance with a predetermined desired arrangement. Prior art fabrication methods, such as welding or notching and swaging, have prevented the bonding of the grid wire to the frame at a point immediately adjacent the lateral support members or straps. This difficulty arises because of the size of the tools required to perform these operations and because of the variation in location of the straps relative to the tools. Furthermore, frequent maintenance of the notching tool, such as refinishing and resharpening the cutting edge, is required because of the hardness of the side support rods which are often made from hard metals, such as molybdenum. Also, machine rethreading is often necessitated because of the wire breakage caused by the swaging operation. When welding is used to bond the grid wire to the frame, difficulties arise because (1) the resultant grid lateral wire is excessively embrittled, (2) when exceedingly fine lateral wire is used, effective contact with welding electrode is rendered difficult and (3) if auxiliary metallic inserts are used to overcome such welding difficulties, the cost of manufacture is substantially increased.

Frame grids formed in accordance with this invention overcome the above disadvantages by providing a frame grid having the grid wire bonded to the lateral support members or straps. Accordingly, it is one object of this invention to provide an improved frame grid wherein the lateral grid wire is bonded to the frame lateral members or straps.

Further objects and attendant advantages of this invention will be better understood from the following description referring to the accompanying drawing and the features of novelty which characterize this invention will be pointed out with particularity in the claims annexed to and forming part of this specification.

In one form of this invention, a frame grid comprising a frame and lateral grid wire wrapped thereupon is fabricated by mounting the frame on rotatable support means. The frame comprises a pair of spaced parallel side support members and a pair of spaced parallel lateral support straps, the straps being clad with an electrically conductive material having a melting point below that of the grid wire. Grid wire is supplied to the frame and directed to a point contiguous to one of the lateral support straps by a wire guide and transfer means. An electric current supplied by a pair of electrodes is passed through the strap at the point where the grid wire is located, passage of current generating sufficient heat to melt the conductive cladding material. The molten material flows over the grid wire and, upon cooling and solidifying, bonds the wire to the strap. Combined rotation of the frame and translation of the wire along the length of the frame produces a helix wound upon the frame, the density of turns being easily controlled by the speed of rotation of the frame and translation of the wire. Upon completion of the winding, the end of the grid wire is bonded to the other lateral strap in the same manner as described above with respect to the first bonding to the lateral strap.

In the drawings,
FIGURE 1 illustrates an improved frame grid formed in accordance with this invention.
FIGURE 2 is a perspective schematic drawing of the apparatus used for forming the improved frame grid.
FIGURE 3 is an enlarged view of apparatus illustrated in FIGURE 2 showing the frame during the grid wire winding step.
FIGURE 4 is an end view of the frame grid illustrating the position of the electrodes during the bonding step.

With reference to FIGURE 1, an improved frame grid 1 formed in accordance with this invention is illustrated as comprising a pair of parallel spaced support members or rods 2, 4 upon which a grid wire helix 6 is wound and a pair of parallel spaced support members or straps 8, 10 transverse to the support rods 2 and 4 and suitably attached thereto. The rods 2, 4 and straps 8, 10 form a grid frame 11. It should be noted that while a single lateral strap located at each end of the support rods would suffice to form a satisfactory frame, it is preferable to use a pair of straps 8, 8a at each end as shown in FIGURE 4 for structural reasons. For simplicity in discussion, the pair of lateral straps at each end will hereinafter be referred to as a single strap.

The wire helix 6 commences at one support strap 8 and ends at the other support strap 10, the grid wire being bonded to each of the support straps 8, 10 at a point intermediate the ends thereof. The support members 2, 4, 8, 10 may be formed as rods or sheet metal members and may be formed from any type of metal selected from a range of materials having suitable strength, thermal and electrical characteristics; for example, molybdenum. Aside from these considerations, the straps 8, 10 are clad with an electrically conductive material having a melting point below that of the grid wire 12 to permit melting of the cladding material to effect bonding of the grid wire 12 to the straps. The grid wire is commonly formed from one of the refractory metals such as tungsten having an extremely high melting point, thus accounting for one of the difficulties heretofore experienced in welding the grid wire to the frame.

The improved frame grid described above is fabricated in the following manner. The frame 11, comprising a pair of support rods 2, 4 and lateral straps 8, 10 attached thereto forming a rectangular aperture 13, is placed on a mandrel 14, one end of the mandrel being disposed within a rotatable chuck 16, the other end being disposed in a driving chuck 18. The driving chuck 18, when actuated, imparts a rotary motion to the frame 11 and rotatable chuck 16 in the direction of the arrows 20 as illustrated in FIGURE 2. After mounting the frame 11 upon the mandrel 14, grid wire 12 is fed from a supply source 22 to a wire transfer means including a grasping device 24 and a pair of wire guides, a stationary guide 26 and a translatable guide 28. The grasping means 24 moves the grid wire 12 along wire guides 26, 28 until the grid wire is contiguous to one of the lateral support straps, for example strap 8.

A pair of electrodes 30, 32 are mounted on a carriage 33. The carriage is arranged for movement towards or away from the mounted grid frame and for movement parallel to the axis of rotation of the frame and driving chuck 18 as indicated by the direction arrows 34, 35 in FIGURE 2. The electrodes are electrically connected to a suitable source of power (not shown). After the grid wire is placed contiguous to the strap 8 at the point intermediate the ends of the strap, preferably near the center thereof, as illustrated in FIGURE 1, the electrodes 30, 32 are moved inwardly against the strap 8 holding the grid wire 12 in place. The electrodes 30, 32 are properly spaced apart so as to include a finite length of strap and grid wire therebetween (FIGURE 4). As was discussed above, the straps are clad with an electrically conductive material having a melting point below that of the grid wire 12. Any suitable material may be used for the cladding, such as nickel or suitable alloys thereof. After the electrodes 30, 32 are placed against the strap 8, the electrodes are energized causing current to flow from one electrode 30 to the other electrode 32 through the clad strap 8. Passage of the current through the clad strap generates sufficient heat to melt the cladding at the location between the electrodes. The molten cladding flows between the electrodes and over the grid wire and, after a very brief cooling period the molten cladding solidifies, forming a bead 36 bonding the grid wire 12 to the strap 8 in a soldered bond.

On completion of the bonding operation, the electrodes 30, 32 are retracted from the frame 11 and then translated parallel to the axis of rotation of the frame until aligned with the second lateral strap 10. The driving chuck 18 is actuated to rotate the mandrel 14, and concomitantly, the frame 11 in the direction of the arrows 20. It should be noted that at the commencement of rotation of the frame 11, the grasping means 24 still firmly holds a portion of the grid wire 12. The rotation of the frame relative to the grasping means 24 causes the grid wire 12 to bend back upon itself and thus effects breaking of the wire 12 at the bead 36. The breaking of the wire is facilitated by the previous bonding step since the heat generated during this step embrittles the wire making it easier to break. Scrap wire removal means such as a vacuum system 37 removes the remaining scrap wire held by the grasping means 24.

While the frame 11 is rotating, the grid wire is caused to translate parallel to the axis of rotation of the frame from the lateral strap 8 towards the lateral strap 10 by the wire guide 28, the speed of rotation of the frame and the speed of translation of the guide being controllable in any suitable manner to determine the turn density of the helix 6 formed by this combined motion. The density is defined as the number of turns of grid wire per unit length of frame. The rotation of the frame 11 and translation of the grid wire 12 are continued until the desired number of turns are formed, the concluding motion being such that the grid wire 12 is placed contiguous to the strap 10 as shown in FIGURE 1. In practice it has been found that due to the pitch of the resultant helix 6 and due to the displacement of the strap surface 38 with respect to the surface of the support rods 2, 4, as may be best seen in FIGURE 4, the grid wire 12 will tend not to move up onto and lie upon the strap 10. Accordingly, it has been found that rotation of the frame 11 should be concluded with the straps 8, 10 in a plane perpendicular to the feeding strand 39 of the grid wire 12, i.e. in a horizontal plane relative to apparatus oriented as shown in FIGURE 2. After stopping rotation of the frame 11 in such a plane, the grid wire 12, which is held in a corner 40 formed by the rod 2 and the strap 10, is then placed upon the lateral strap 10 by moving either the wire guide 28 past the strap 10 or by moving the frame 11 past the wire guide 28. This latter step may be accomplished by moving the index turret 41 on which the chuck 16 is mounted towards the right in FIGURE 2. After translating frame 11 relative to the wire guide 28, the frame is then rotated 90 degrees so that the strap 10 will be coplanar with the feeding strand 39, i.e. in a vertical position as illustrated in FIGURE 2. This series of steps will place one-half a turn of the grid wire 12 upon the strap 10 as may be seen in FIGURE 1.

After properly placing the grid wire 12 upon the strap 10, the electrodes 30, 32 are then moved into position against the strap 10 holding the grid wire thereagainst and the bonding step described above is repeated forming a bead 36 on the lateral strap 10 bonding the grid wire 12 to that strap. Subsequent to the second bonding step the grasping means 24 is moved toward the strap 10 and below the frame 11 to grasp the feeding strand 39 vertically below the bead 36. The index turret 41 is then moved away from the driving chuck 18 and grasping means 24 thus breaking the grid wire at the bead and permitting removal of the improved frame grid 1 from the mandrel 14, and the insertion of a new frame thereon. As mentioned earlier, the heating of the strap 10 and grid wire 12 during the bonding step embrittles the wire facilitating breakage thereof. It will thus be seen that the separate operational steps of breaking the grid wire after bonding the wire to both straps is obviated thereby further reducing the cost of manufacture. The grasping means then returns to its initial position placing the grid wire against the strap of the next frame to be wound.

It may be seen that through the use of the above-described apparatus and method for fabricating a frame grid, an improved frame grid 1 results which is easily and inexpensively fabricated and which permits extending the length of the grid helix to the lateral straps.

Although the specific method and apparatus for forming the improved grid have been shown and described above, it would be apparent to those skilled in the art that numerous changes, combinations and substitutions of equivalents might be made. It is therefore contemplated by the claims which conclude the specification to cover all such modifications as fall within the true scope and spirit of this invention.

We claim:
1. A frame grid comprising a frame including a first pair of parallel spaced support members and a second pair of parallel spaced lateral support members transverse to said first pair and attached thereto, a helix of lateral grid wire wound upon said first pair of members, one end of said grid wire being fixed to one of said second pair of members intermediate the ends thereof, and the other end of said wire being fixed to the other of said second pair of members intermediate the ends thereof.

2. A frame grid as defined in claim 1 wherein said second pair of members are clad with an electrically conductive material having a melting point below that of said grid wire.

3. A frame grid as defined in claim 2 wherein said lateral wire is fabricated from a refractory metal and said second pair of members are straps clad with nickel.

References Cited by the Examiner
UNITED STATES PATENTS

| | | | |
|---|---|---|---|
| 3,059,669 | 10/62 | Fitzpatrick | 140—71.5 |
| 3,064,692 | 11/62 | Grimone et al. | 140—71.5 |
| 3,126,496 | 3/64 | Reid | 313—350 |
| 3,141,991 | 7/64 | Van Tol et al. | 313—350 |

DAVID J. GALVIN, *Primary Examiner.*

JOHN W. HUCKERT, *Examiner.*